United States Patent
Williams et al.

(10) Patent No.: US 7,590,542 B2
(45) Date of Patent: Sep. 15, 2009

(54) METHOD OF GENERATING TEST SCRIPTS USING A VOICE-CAPABLE MARKUP LANGUAGE

(76) Inventors: Douglas Carter Williams, 12 Abel Jones Pl., Acton, MA (US) 01720; Wesley C. Hand, Jr., 14 Dan Hill Rd., Londonderry, NH (US) 03053; Henry Houh, 26 Liberty Ave., Lexington, MA (US) 02420; Albert Robinson Seeley, 5 Brenda La., Burlington, MA (US) 01803

( * ) Notice: Subject to any disclaimer, the term of this patent is extended or adjusted under 35 U.S.C. 154(b) by 1162 days.

(21) Appl. No.: 10/431,084

(22) Filed: May 7, 2003

(65) Prior Publication Data

US 2003/0212561 A1 Nov. 13, 2003

Related U.S. Application Data

(60) Provisional application No. 60/378,735, filed on May 8, 2002, provisional application No. 60/378,817, filed on May 8, 2002.

(51) Int. Cl.
*G10L 11/00* (2006.01)
(52) U.S. Cl. .................... 704/270.1; 704/235; 704/260; 704/270
(58) Field of Classification Search ........................ None
See application file for complete search history.

(56) References Cited

U.S. PATENT DOCUMENTS

| | | | |
|---|---|---|---|
| 5,983,001 A | 11/1999 | Boughner et al. | |
| 6,456,699 B1 * | 9/2002 | Burg et al. | 379/88.17 |
| 6,697,964 B1 * | 2/2004 | Dodrill et al. | 714/38 |
| 6,920,425 B1 * | 7/2005 | Will et al. | 704/275 |
| 2002/0083213 A1 | 6/2002 | Oberstein et al. | |
| 2003/0074606 A1 | 4/2003 | Boker | |

OTHER PUBLICATIONS

PCT Search Report, PCT Application No. PCT/US03/14349.
Nolan: "A Look at e-Test Suite 3.1 by RSW;" OOCID: <XP_2155308A_1>; Software Testing & Quality Engineering; Jul./Aug. 1999; two sheets.

* cited by examiner

*Primary Examiner*—Richemond Dorvil
*Assistant Examiner*—Leonard Saint Cyr

(57) ABSTRACT

A method is disclosed for generating test scripts for testing an IVR from an IVR's voice-capable markup language application. The test scripts can be generated directly from the voice-capable markup language application, from a product which provides a graphical representation of the IVR from the IVR's voice-capable markup language application, or a grid can be used to represent the tags within the voice-capable markup language application and a test script generated from the grid. Additionally, a virtual telephone caller system is provided to test the IVR of a contact center, wherein the virtual telephone caller system operates with voice-capable markup language software scripts.

35 Claims, 12 Drawing Sheets

METHOD OF GENERATING TEST SCRIPTS USING A VOICE-CAPABLE MARKUP LANGUAGE

CROSS REFERENCE TO RELATED APPLICATIONS

This application claims priority under 35 U.S.C. §119 (e) to provisional application Ser. No. 60/378,735 filed May 8, 2002, and to provisional application Ser. No. 60/378,817 filed May 8, 2002 the disclosures of which are hereby incorporated by reference.

STATEMENT REGARDING FEDERALLY SPONSORED RESEARCH

Not Applicable.

FIELD OF THE INVENTION

This invention relates generally to the use of a voice-capable markup language to provide voice testing of an interactive voice response (IVR) system, and to a method of generating test scripts for IVR systems from voice-capable markup language applications.

BACKGROUND OF THE INVENTION

Computers have been applied as test computers associated with contact centers. Contact centers are known to those of ordinary skill in the art as those systems to which a person can communicate to receive information. Such communication can include, but is not limited to, telephone calls, Internet access, email, and FAX.

A contact center can include one or more interactive voice response (IVR) applications, which can be run across one or more IVR systems. The one or more IVRs provide automatic branching voice queries to which the caller responds with button pushes on a telephone keypad or with voice responses on a telephone. The contact center is provided having only the one or more IVR systems, or alternatively, it is also provided having human agents. For example, at the end of the IVR branching voice queries, the caller can be directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they correspond to distinct electronic systems and will be separately referred to herein.

The contact center can also include one or more database server computers, one or more database storage areas, one or more web server computers, and one or more email server computers.

Various testing systems have been provided to test functions associated with the contact center. For example, the HammerIT™ from Empirix, Inc. of Waltham, Mass., can be used to simulate telephone callers in a public switched telephone network (PSTN) having one or more telephone callers who access the contact center either sequentially or in parallel. The HammerIT™ system provides a "virtual telephone caller system" having "virtual telephone callers" that can exercise and test the responses of the one or more IVR systems. The virtual telephone caller system can also be used to test the agent telephone functions of the contact center, providing a "virtual agent telephone system" having "virtual agent telephones." The virtual telephone caller system can also be used to test FAX functions of the contact center.

Various testing systems have also been provided to test the agent computer function of the contact center. For example, the E-test™ system from the Empirix Inc. can be used to simulate the computer functions of the agent computer, providing a "virtual agent computer system" having "virtual agent computers." The E-test™ system can also provide a "virtual web user system" having "virtual web users" that include simulations of people who access web pages on a web server within the contact center, people who send/receive email associated with an email server within the contact center, and people who send/receive FAX information associated with a FAX system within the contact center. The virtual telephone caller systems, virtual agent telephone systems, virtual agent computer systems, and virtual web user systems will hereafter be referred to as "virtual test systems." The overall prior art system is shown below in association with FIG. 1.

Virtual telephone caller systems have been provided that are programmed in a variety of ways. For example, the HammerIT™ virtual telephone caller system described above can be programmed in Hammer Visual Basic. The Hammer Visual Basic program corresponds to a test script that causes the virtual telephone caller system to perform a sequence of programmed tests of the contact center, and in particular, test of the one or more IVR systems within the contact center. For example, the test script can be associated with simulated telephone caller queries to the IVR, such as simulated telephone keypad button pushes or telephone caller voice commands.

Alternatively, a graphical user interface (GUI) can be provided that allows the user to program the virtual telephone caller system using graphical icons that can be connected together in a "call flow diagram." Such graphic user interfaces provide automatic test generation. For example, the Hammer CallMaster™ software system from Empirix, Inc. of Waltham, Mass., allows the user to interconnect icons on a graphical display, each icon representing an action (or set of actions) to be taken by the virtual telephone caller system, and the interconnections corresponding to a sequence of actions. The call flow diagram results in the automatic generation of the test script described above.

Call flow diagrams are created using a graphical call flow editor in conjunction with a standard library of call flow icons. Each call flow icon is associated with test code necessary to execute the call flow action and an appropriate set of default telephony parameters. These parameters can be overridden on either a global or instance basis. Users can also specify the data to be used in the tests.

Automatic test generation software, is provided, (for example, as part of the Hammer CallMaster™ software system described above), that can exercise the variety of branches through the call flow diagram in a way prescribed by the user. The automatic test generation software eliminates the tedious, unreliable and time-consuming process of manual test design and execution by giving users the power to automatically generate and execute tests derived from a call flow diagram.

By way of the automatic test generation software, test developers create automated tests simply by generating the call flow diagram. Using automatic test generation technology, the software then automatically generates a set of test scripts that are used to exercise all or part of the call flow paths and data in the call flow diagram. Under user control, tests can be generated to do focused testing of a new feature, or general regression testing of the entire application. The same tests can be used for post-deployment monitoring and maintenance to ensure that the application continues to deliver the highest possible level of performance.

As described above, the virtual telephone caller system can be programmed in a programming language to directly provide the test scripts. Alternatively, as also described above, the user can generate the call flow diagram, and the system can automatically convert the call flow diagram to the test scripts. The test scripts act upon virtual telephone caller system hardware to provide simulated telephone calls and simulated telephone caller actions, such as telephone button pushes. Virtual telephone caller systems have used test scripts provided in a variety of software languages. Visual Basic based software is but one language that can be used by the user to program the virtual telephone caller systems.

Some IVR systems can be programmed using Voice Extensible Markup Language (VXML), and/or other speech or voice-capable markup languages, for example, Speech Application Language Tags (SALT), and Call Control Extensible Markup Language (CCXML). Voice-capable markup languages, for example VXML, SALT, and CCML, are extensible markup languages (XMLs) that can be used to represent human-computer dialogs, and have proven useful for the creation of IVR applications. A voice-capable markup language application, for example a VXML, SALT, or CCML application, can include one or more text files called documents. These document files are denoted by a ".vxml" (or similar) file extension and contain the various voice-capable markup language instructions for the application.

VXML, and other voice-capable markup languages, take advantage of improvements in computer-based speech recognition and text-to-speech synthesis, spread of the World Wide Web and associated technologies and development techniques beyond the desktop computer, and standards organizations that promote markup language and protocol formats. The Internet has begun to extend beyond computers to other devices such as personal digital assistants (PDAs) with wireless data connections, and mobile phones supporting the Wireless Application Protocol (WAP). There are a far greater number of telephones than Internet connected computers in the world today. Mobile phones are achieving greater popularity in part because they are small, light, inexpensive, and have a long battery life, making them far more portable than computers. Mobil phones can be used for applications that aren't feasible on computers, such as location-based services.

IVRs utilizing VXML have shown promise in several applications. One such application involves information retrieval. In these types of applications, output tends to be pre-recorded information, and voice input is often limited to navigational commands and limited data entry commands. A particular information retrieval application that makes use of voice input is a weather application that gets the location as a city name which is spoken by the user.

Another application for a VXML based IVR system includes telephone services. A corporation uploads a voice web site to its voice service provider with information, news, upcoming events, and an address book. The address book is then used for voice dialing people in the corporation.

Yet another application involves electronic commerce. Catalog ordering applications; customer service applications such as package tracking, account status, and call centers; and financial applications such as banking, stock quotes and trading are further examples of electronic commerce IVR applications which incorporate VXML. While IVRs incorporating VXML are gaining in popularity, testing of the IVRs has proven difficult.

SUMMARY OF THE INVENTION

The present invention provides a virtual telephone caller system, used to test an interactive voice response system (IVR), and for which the test scripts, whether manually generated or automatically generated, are generated in a voice-capable markup language, for example, voice extensible markup language (VXML). With this particular arrangement, certain aspects of the telephone caller system become more efficient to program. In addition certain aspects of the virtual telephone caller system can be integrated to be within the IVR. A method is also disclosed for generating test scripts for testing an IVR from an IVR's voice-capable markup language application. The test scripts can be generated directly from the voice-capable markup language application, from a product which provides a graphical representation of the IVR from the IVR's voice-capable markup language application, or a grid can be used to represent the tags within the voice-capable markup language application and a test script generated from the grid.

BRIEF DESCRIPTION OF THE DRAWINGS

The invention will be more fully understood from the following detailed description taken in conjunction with the accompanying drawings, in which.

DETAILED DESCRIPTION OF THE INVENTION

Before describing the method of generating test scripts using voice-capable markup language, some introductory concepts and terminology are explained. As used herein, the term "virtual telephone callers" is used to describe simulated telephone callers provided by a "virtual telephone caller system" that generates simulated telephone signals corresponding to a public switched telephone network (PSTN). The term "virtual web users" is used to describe simulated web page users provided by a "virtual web user system" that generates simulated Internet signals corresponding to the Internet. The term "agent" will be used herein to describe a person at a contact center who responds to a telephone caller. The term "virtual agent telephone" is used herein to describe a simulation of the verbal responses of an agent at a contact center, provided by a "virtual agent telephone system." The term "virtual agent computer" is used herein to describe a simulation of the computer display provided to the agent at a contact center, provided by a "virtual agent computer system."

As used herein, the term "voice-capable markup language" refers to one of a variety of extensible markup languages, including but not limited to, Voice Extensible Markup Language (VXML), Speech Application Language Tags (SALT), and Call Control Extensible Markup Language (CCML), including any versions thereof As is known, each of these voice-capable markup languages is capable of providing a voice output and receiving a voice input. While the invention is primarily shown and described below in conjunction with the VXML voice-capable markup language, it should be understood that the invention applies equally well to other embodiments using any voice-capable markup language.

Figure 1:
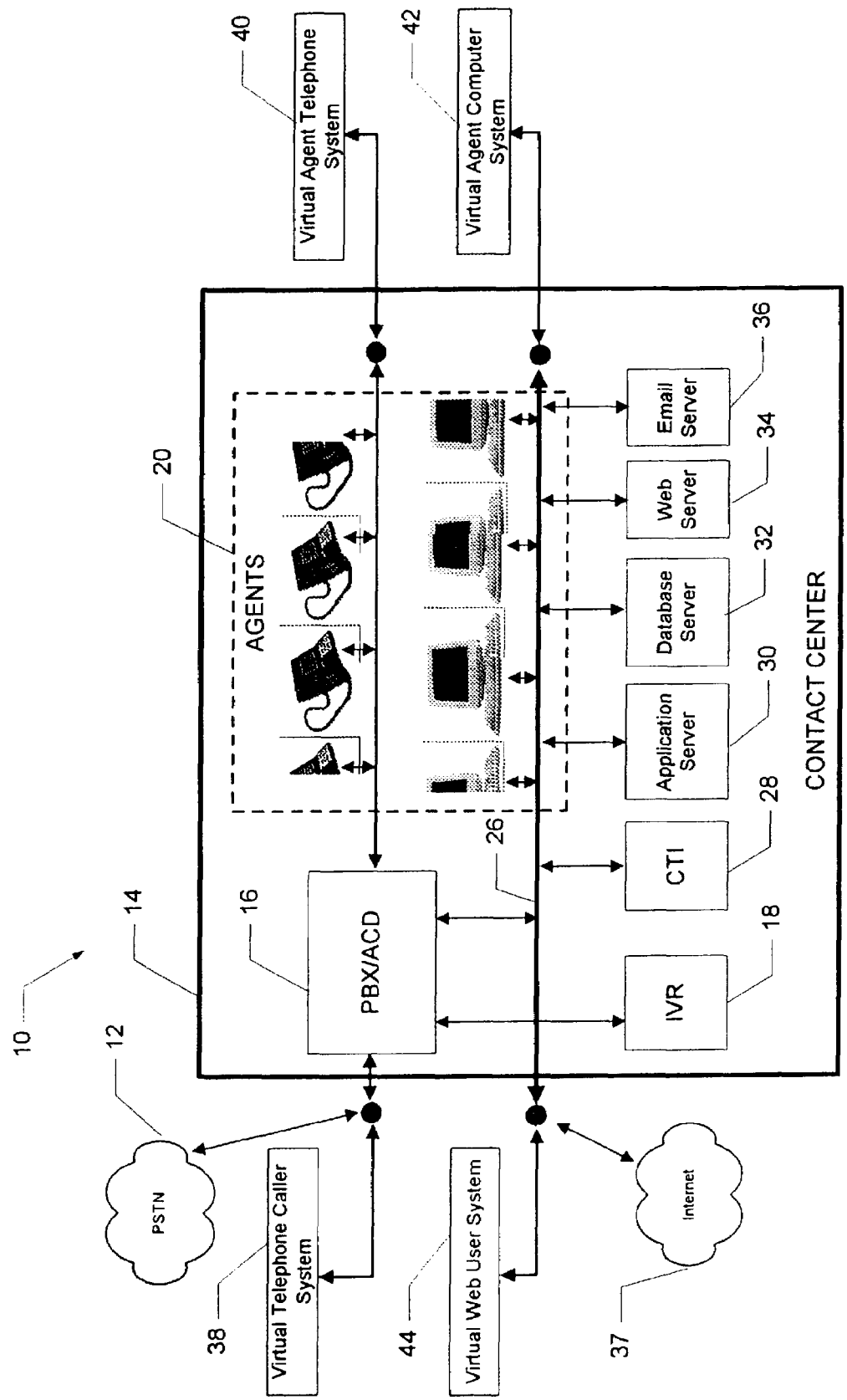
FIG. 1 is a block diagram of a prior art testing system employed used to test a contact center.

Referring now to FIG. 1, a prior art contact center and test system 10 is connected to the public switched telephone network 12 (PSTN). The PSTN is well known to be the worldwide telephone system that provides telephone call connections, including telephone connections to a contact center 14. The contact center 14 can include a private branch exchange 16 (PBX) usually combined with an automatic call distributor 16 (ACD). The PBX 16 comprises a sub-system that can route incoming telephone calls to intended call recipients, or agents. The ACD 16 comprises a sub-system that can provide call queuing and automatic wait handling of incoming telephone calls. The PBX/ACD 16 can be coupled to one or more interactive voice response systems 18 (IVR). The IVR 18, as described above, is known to be a system that provides voice queries to a telephone caller. Voice queries typically direct the telephone caller through a series of selections that can be chosen by the telephone caller via button pushes on the telephone keypad.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a network 26 that can be provided to couple together the PBX/ACD 16, the agent computers, for example agent computer 24, a computer telephony integration (CTI) server 28, an application server 30, a database server 32, a web server 34, and an email server 36. The bus 26 can correspond to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the bus 26. The CTI 28 receives the identifying information and coordinates the identifying information with "caller data," for example account history associated with the telephone caller, contained in the database server 32. An application program in the application server 30, can automatically provide a display of the caller data in a "screen pop" to the agent disposed upon the agent computer 24. Alternatively, the application program can reside within the agent computer 24.

When a contact center has no CTI 28, or if the screen pop is delayed by system data flow bottlenecks, the agent can manually identify the telephone caller using the agent computer 24 by manually entering the identifying information via the keyboard of the agent computer 24.

The contact center 14 can also be accessed via the Internet 37, for example by a web user who accesses a web page associated with the contact center. The web user, via the Internet 37, connects to the web server 34 for web page access. The web user can also be an email user, in which case the email user connects to the email server 36 via the Internet 37. While web page access and email access have been described herein, the invention is not limited to only these specific Internet applications. A variety of Internet applications can access a variety of servers within the contact center 14.

Virtual test systems have been applied to contact centers. For example, virtual telephone caller systems 38 have been provided to simulate telephone callers within the PSTN 12. The virtual telephone caller system 38 can generate "virtual telephone caller actions," for example virtual telephone calls, to the contact center 14, thereby accessing the PBX/ACD 16, the IVR 18, and agent telephones, for example agent telephone 22. The virtual telephone caller system 38 can also receive contact center functions, for example an IVR audio response. With this particular arrangement, the IVR 18 can be tested for response accuracy and response time. The PBX/ACD 16 can be tested for agent telephone access integrity and response time.

Similarly, virtual agent telephone systems 40 have been provided that can generate "virtual agent telephone actions" to simulate agents 20 within the contact center 14 who answer telephone calls. The virtual agent telephone system 40 can also receive contact center functions, for example automatic voice data.

As mentioned above, the various elements of the contact center 14 can provide a screen pop upon the agent computers, for example agent computer 24. Virtual agent computer systems 42 have been provided that can generate "virtual agent computer actions" and receive contact center functions, for example screen pops and accesses to the data base server 32, to test the accuracy and the speed of such screen pops and the general speed and accuracy of accesses to the database server 32. The virtual agent computer system 42 can simulate multiple agent computers 24.

Virtual web user systems 44 have been provided that can generate "virtual web user actions" and receive contact center functions to test the Internet functions of the contact center 14. For example, the virtual web user system 44 can simulate one or more web users who access the contact center web pages that reside upon the web server 34. The web connection and web server 34 can thus be tested for web page accuracy and speed. Similarly, the virtual web user system 44 can simulate multiple emails from multiple web users. The web connection and the email server 36 can be tested for accuracy and speed.

The virtual telephone caller system 38 can be used to test the IVR 18 and associated voice applications. Among the IVR tests of interest, an IVR audio response can be tested to assure that it complies with the expected response. It will be recognized that an IVR system has a variety of responses to a variety of inputs from a telephone caller, or here, from the virtual telephone caller system 38.

Figure 2:
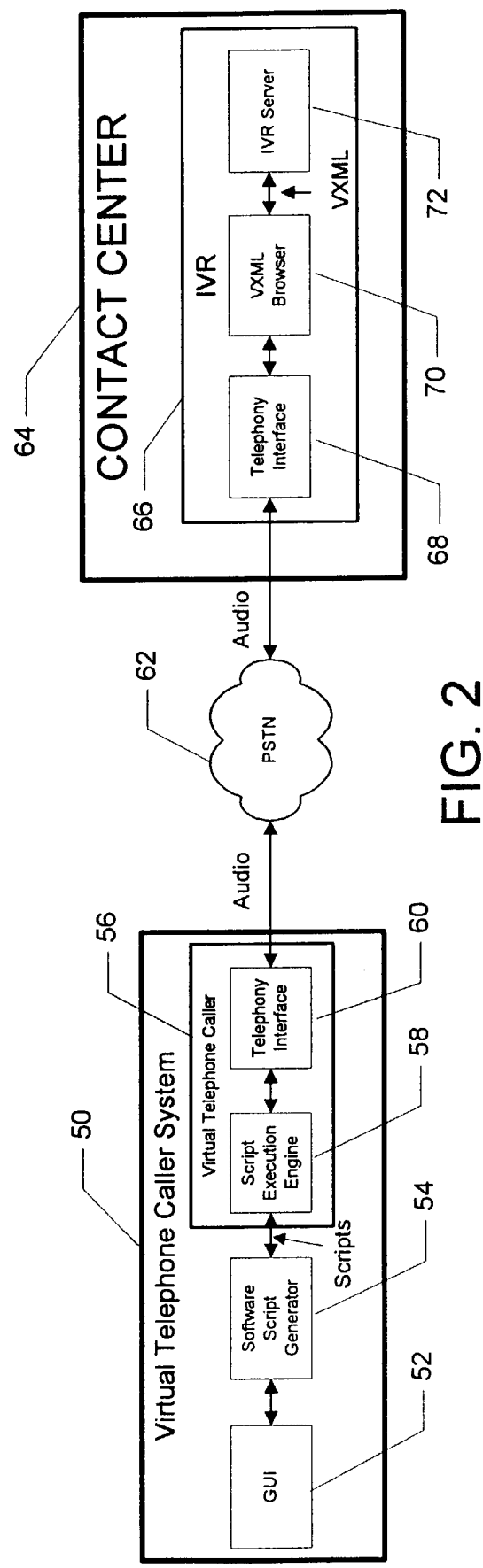
FIG. 2 is a block diagram showing greater detail of a prior art virtual telephone caller system used to test an interactive voice response (IVR) system.

Referring now to FIG. 2, a prior art virtual telephone caller system 50 includes one or more graphical user interfaces (GUIs) with which the virtual telephone caller system can be programmed, and with which test results can be viewed. The GUI 52 is coupled to a software script generator 54. The software script generator 54 can provide either a software editor with which one or more test scripts can be manually entered by the user, or an automatic test script generator that can automatically provide the one or more test scripts, for example with a call flow diagram as described above. The software script generator 54 provides the one or more test scripts to the script execution engine 58, part of the virtual telephone caller 56. The script execution engine 58, in conjunction with the telephony interface 60, provides audio telephone signals to the public switched telephone network (PSTN) 62 in response to the one or more test scripts.

The audio telephone signals can be provided having both a signaling portion and a real time (RT) portion, wherein the signaling portion corresponds to the dialing of a telephone call, and the RT portion corresponds to audio that can either be voice or telephone button pushes corresponding to human telephone caller actions, for example dialing a call, and to human telephone caller responses to actions of the contact center 64.

The contact center 64 is also coupled to the PSTN 62 and receives the audio telephone signals generated by the virtual telephone caller system 50. The audio telephone signals are routed to the IVR 66 by the PBX/ACD (not shown), e.g. PBX/ACD 16 of FIG. 1. The audio telephone signals are received by the telephony interface 68. The telephony interface 68 provides an audio to text conversion, thereby providing text representations of the audio telephone signals to the voice extensible markup language (VXML) browser 70. The VXML browser 70 recognizes the text representations provided by the telephony interface 68 and generates a software linkage to a VXML response page, the software linkage communicated to an IVR Server 72. The IVR server, upon receiving the software linkage to the VXML response page, responds with the VXML response page. The VXML response page is converted by the VXML browser 70 into an IVR audio response. The IVR audio response can be any number of synthesized or pre-recorded voice messages. The IVR audio response is coupled to the telephony interface 68, through which the IVR audio response is coupled to the PSTN 62.

The IVR audio response, carried within the PSTN 62, is coupled to the telephony interface 60. The telephony interface 60 receives and evaluates the response. In one particular embodiment, the IVR audio response is converted to a response text. The response text is communicated to the script execution engine 58. The script execution engine 58 is programmed by the user to recognized the correct response text corresponding to the original audio telephone signal as generated by the script execution engine 58 and described above. The script execution engine 58, upon receiving the correct response text, proceeds to next step of the test script. Otherwise, if an incorrect or unintelligible response text is received, the script execution engine 58 records the receipt and/or the content of the incorrect or unintelligible response text, and either proceeds to the next test script step, or alternatively, stops execution.

Figure 3:
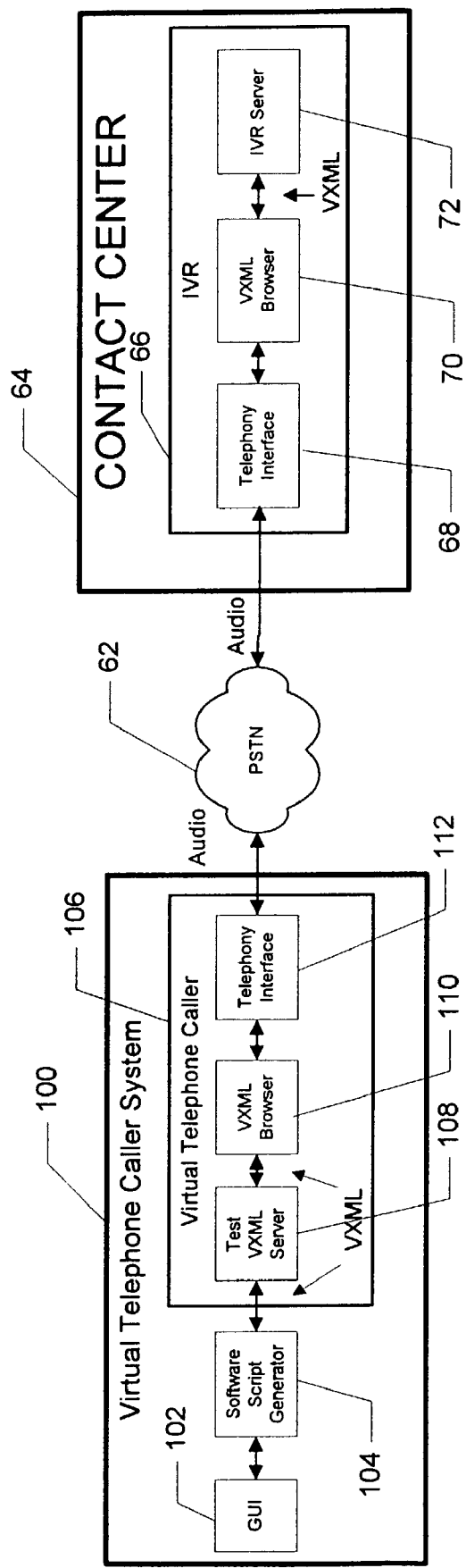
FIG. 3 is a block diagram of a virtual telephone caller system in accordance with the present invention used to test an IVR system.

Referring now to FIG. 3, in which like elements of FIG. 2 are provided having like reference designations, a virtual telephone caller system 100, in accordance with the present invention, includes a GUI 102. The GUI 102 is coupled to a software script generator 104. As described above in association with FIG. 1, the software script generator 104 can provide either a software editor with which one or more test scripts can be manually entered by the user, or an automatic test script generator that can automatically provide the one or more test scripts.

With this particular arrangement, the one or more test scripts are generated in VXML software language. The one or more test scripts are coupled to the test VXML server 108, and are thereby executed within the test VXML server 108. When a step of the one or more test scripts is executed by the test VXML server 108, the execution causes a VXML test page to be called from the test VXML server 108. The VXML test page is coupled to the VXML browser 110. The VXML browser 110 generates a simulated audio telephone signal in response to the VXML test page and couples the simulated audio telephone signal to the telephony interface 112. The simulated audio telephone signal corresponds to the audio telephone signal described above, and is hereafter again referred to as the audio telephone signal. As described above, the audio telephone signal can be either the signaling portion or the RT portion of a telephone call. The audio telephone signal is coupled to the PSTN, whereby it is further coupled to the contact center 64. The contact center processes the audio telephone signal in the same way that the audio telephone signal of FIG. 2 is processed, thereby generating the IVR audio response onto the PSTN 62.

The IVR audio response is received by the telephony interface 112, whereupon it is converted to a response text and coupled to the VXML browser 110. The VXML browser 110, in response to the response text, calls a corresponding VXML compare page from the test VXML server 108.

The test VXML server 108 is programmed by the user to recognize the correct VXML compare page corresponding to the original audio telephone signal generated by the VXML browser 110 and described above. The test VXML server 108, upon receiving the correct VXML compare page, proceeds to the next test script step. Otherwise, if incorrect or unintelligible response text is generated by the VXML browser 110 in response to the IVR audio response, the test VXML server 108 records the receipt (including timings) and/or the content of the incorrect or unintelligible response text, and either proceeds to the next test script step, or alternatively, stops execution.

While the contact center 64 is shown and described to have the VXML browser 70 adapted to provide a VXML response page and associated audio IVR response, it should be understood that the present invention is not limited to testing of a contact center having an IVR that uses VXML. For example, some contact centers have conventional IVR systems that provide a voice response as synthesized voice. Other contact centers have an IVR that uses another voice capable markup language, for example SALT or CCML. These other contact centers can be tested equally well by the present invention.

Figure 4A:
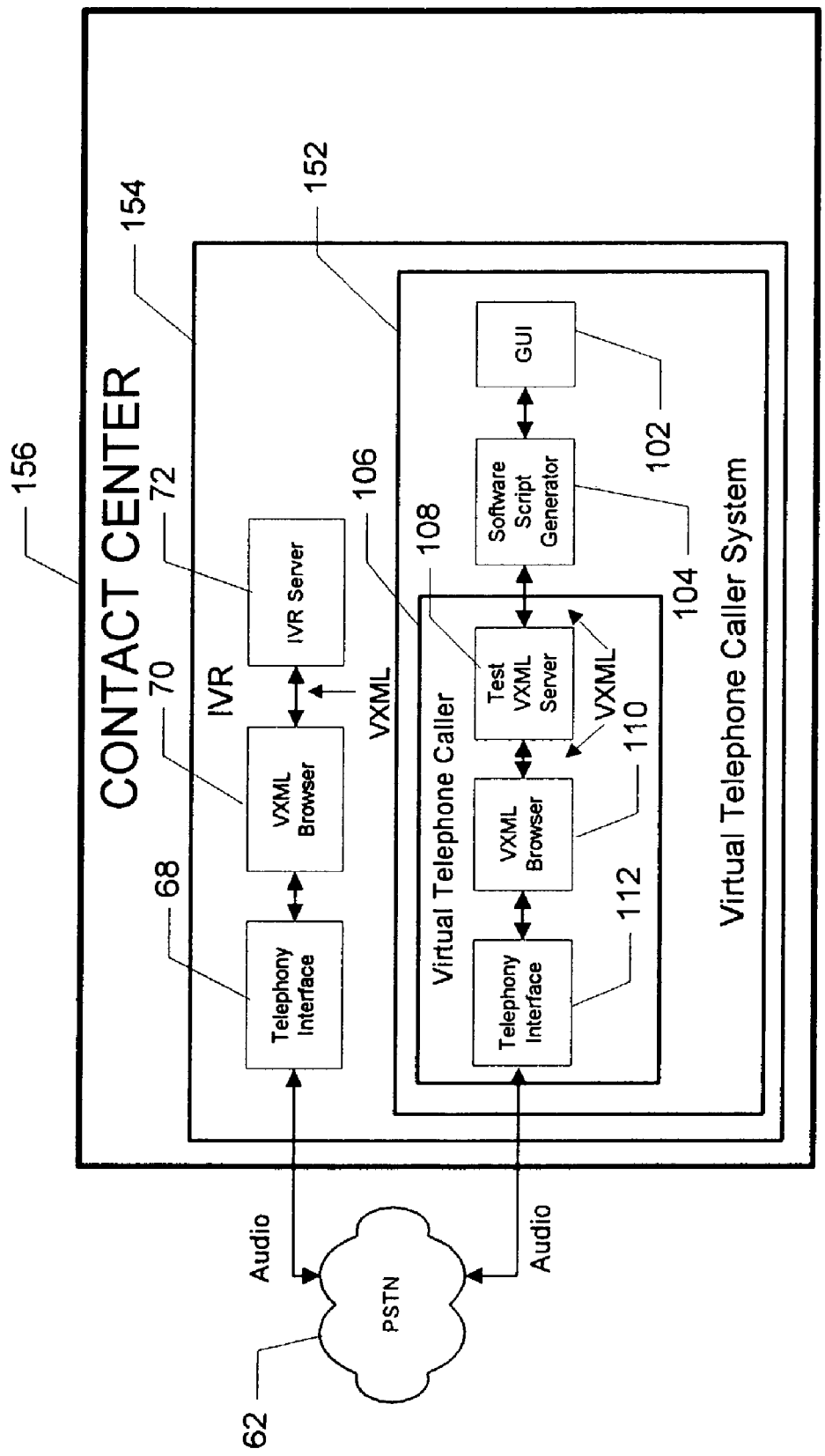
FIG. 4A is a block diagram of an alternate embodiment of a virtual telephone caller system in accordance with the present invention used to test an IVR system.

Referring now to FIG. 4A, in which like elements of FIG. 3 are provided having like reference designations, an alternate embodiment of the virtual telephone caller system 152 is provided in direct association with an IVR system 154 within a contact center 156. The elements of the virtual telephone caller system 152 are provided and operate in the same way as those elements of the virtual telephone caller system 100 of FIG. 3. Similarly, the telephony interface 68, the VXML browser 70 and the IVR server 72 are provided and operate in the same way as those elements of the IVR 66 of FIG. 3.

With this particular arrangement, the virtual telephone caller system 152 is located within the IVR 152, yet the virtual telephone caller system 152 and the IVR 154 are both coupled to the PSTN in the same way as the corresponding virtual telephone caller system 100 and the IVR 66 of FIG. 3.

It will be recognized that the test VXML server 108 and the IVR server 72 can be provided within a common server hardware.

Figure 4B:
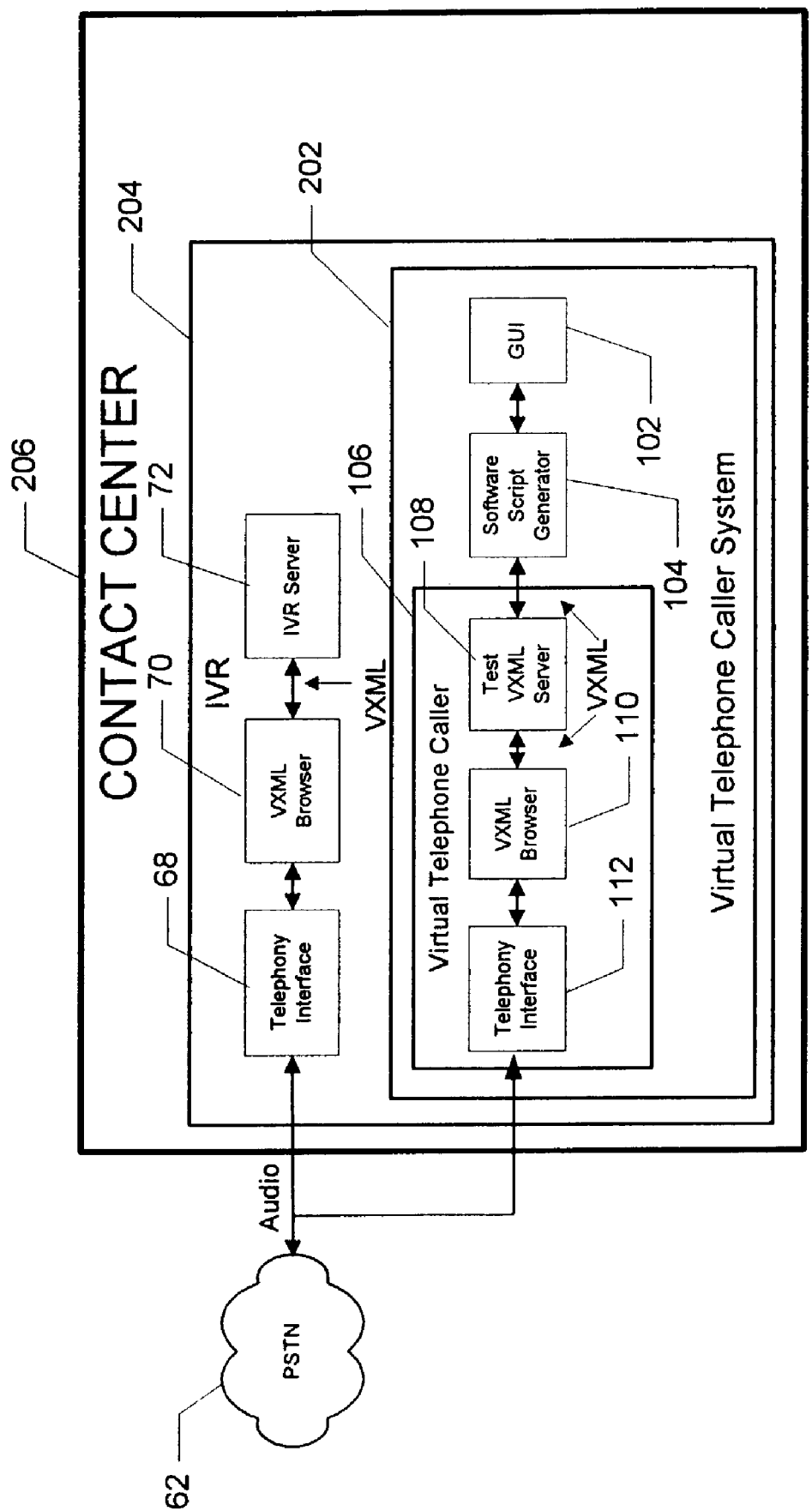
FIG. 4B is a block diagram of another alternate embodiment of a virtual telephone caller system in accordance with the present invention used to test an IVR system.

Referring now to FIG. 4B, in which like elements of FIG. 3 are provided having like reference designations, another alternate embodiment of a virtual telephone caller system 202 is provided in direct association with an IVR system 204 within a contact center 206. The elements of the virtual telephone caller system 202 are provided and operate in the same way as those elements of the virtual telephone caller system 100 of FIG. 3. Similarly, the telephony interface 68, the VXML browser 70 and the IVR server 72 are provided and operate in the same way as those elements of the IVR 66 of FIG. 3. Here, however, the telephony interface 112 and the telephony interface 68 are directly coupled, without first passing through the PSTN 62. With this particular arrangement, the virtual telephone caller system 202 is located within the IVR 204.

Figure 4C:
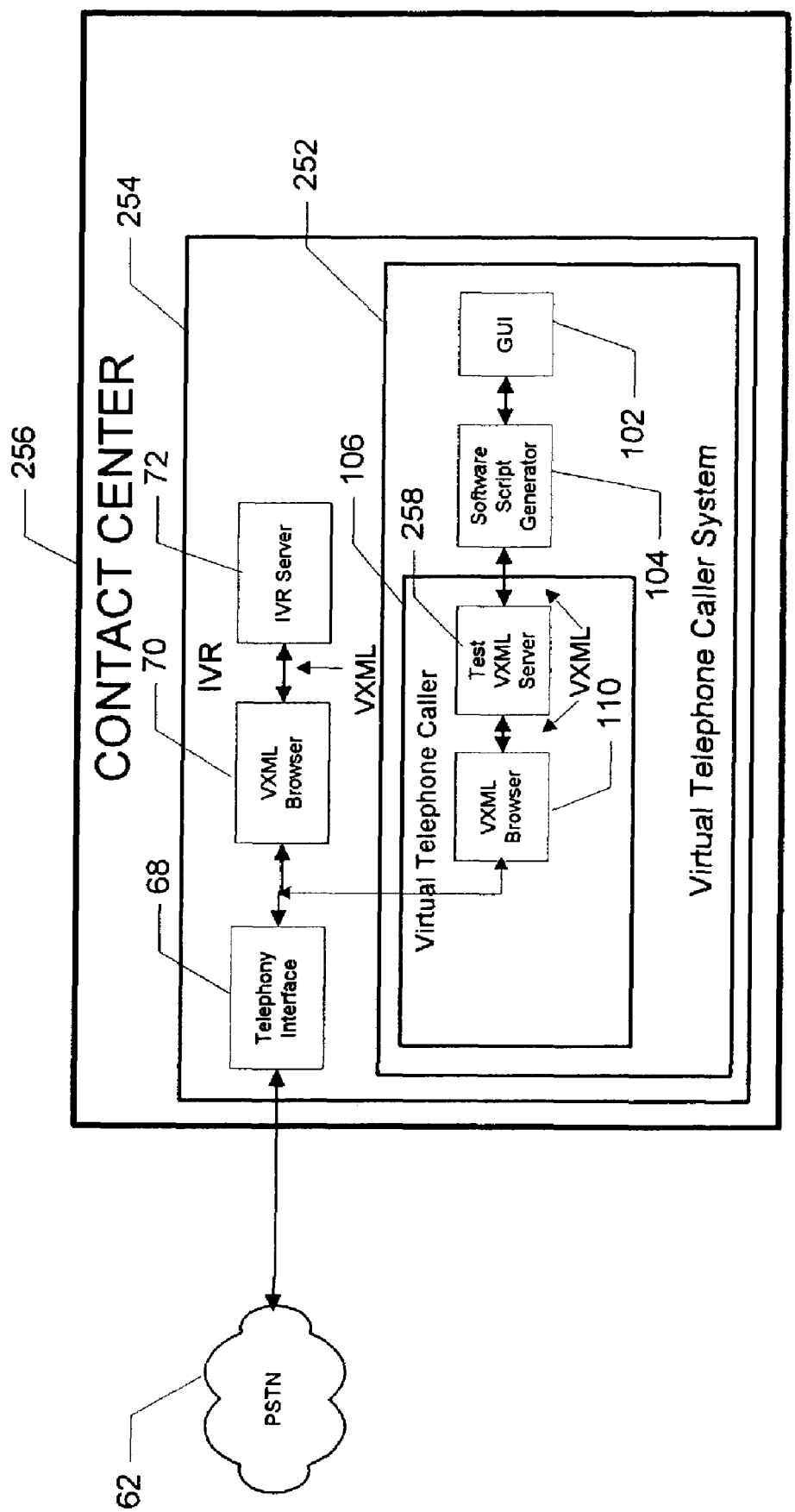
FIG. 4C is a block diagram of yet another alternate embodiment of a virtual telephone caller system in accordance with the present invention used to test an IVR system.

Referring now to FIG. 4C, in which like elements of FIG. 3 are provided having like reference designations, another alternate embodiment of a virtual telephone caller system 252 is provided in direct association with an IVR system 254 within a contact center 256. The elements of the virtual telephone caller system 252 are provided and operate in the same way as those elements of the virtual telephone caller system 100 of FIG. 3. Similarly, the telephony interface 68, the VXML browser 70 and the IVR server 72 are provided and operate in the same way as those elements of the IVR 66 of FIG. 3. Here, however, the virtual telephone caller system 252 does not contain a telephony interface, e.g. the telephony interface 112 of FIGS. 3, 4A, and 4B. Instead, the VXML browser 110 is coupled directly to the VXML browser 70. With this particular arrangement, a voice output from the VXML browser 112 can be directly received by the VXML browser 70.

Figure 6:
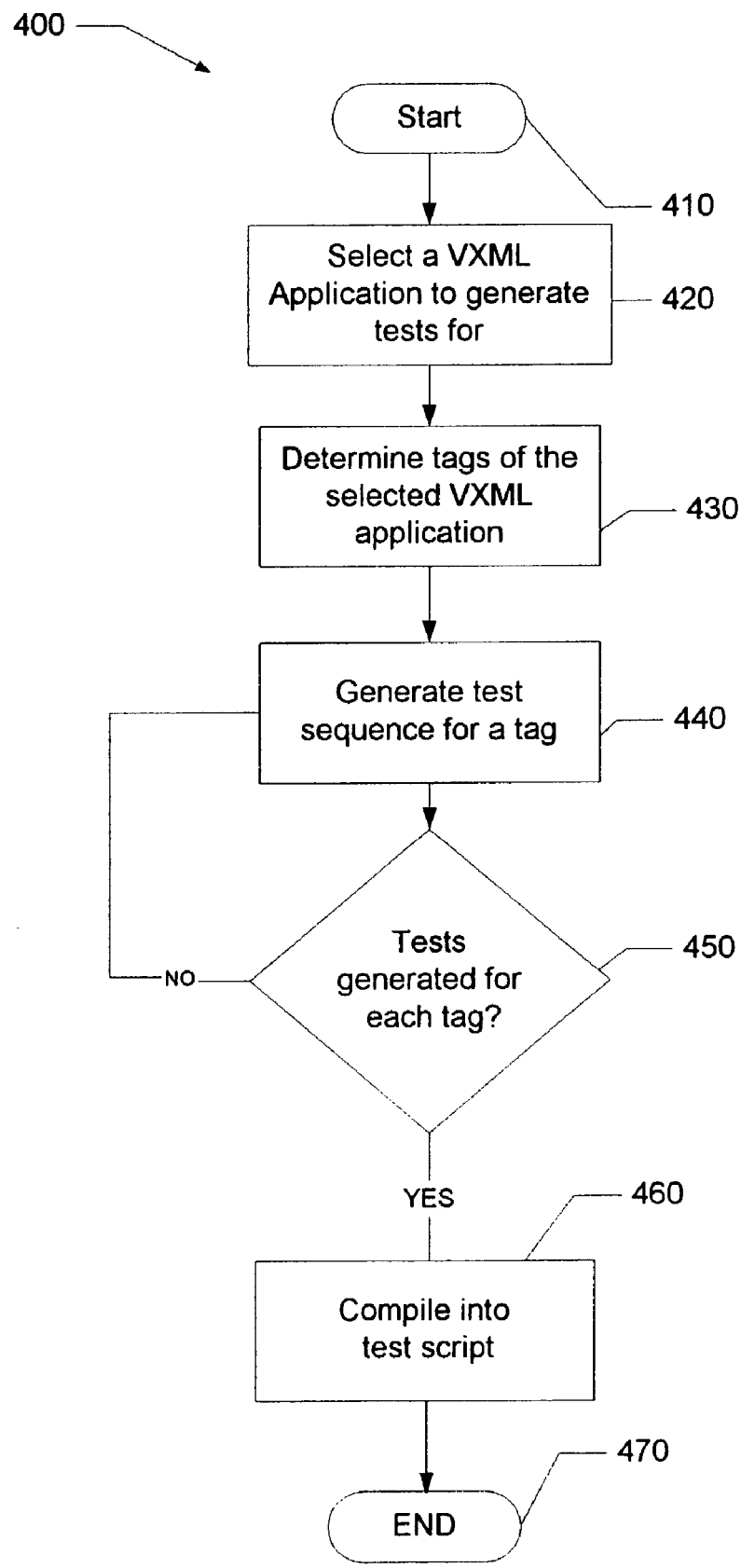
FIG. 6 is a flow chart of a first method for generating test scripts from VXML applications.
Figure 8:
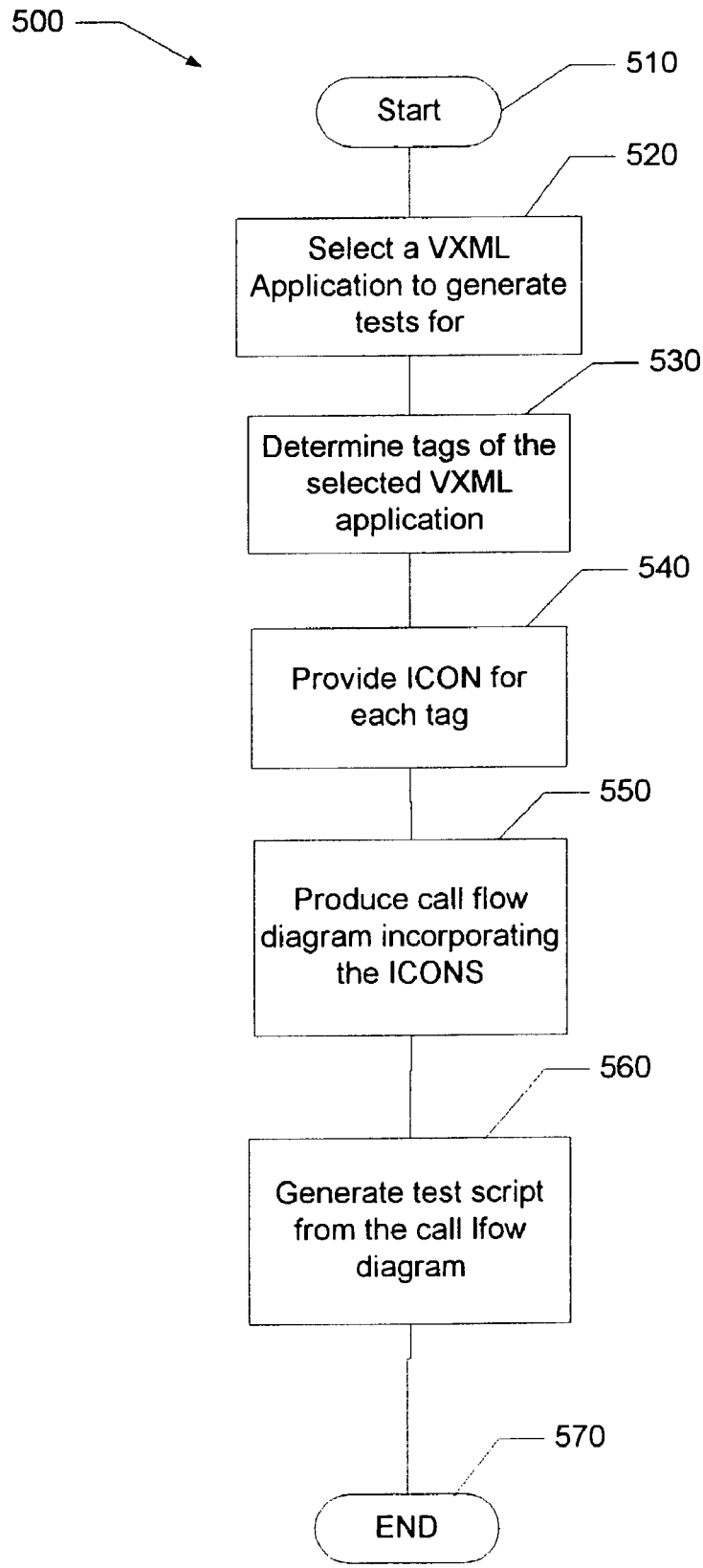
FIG. 8 is a flow chart of a second method for generating test scripts from VXML applications.
Figure 10:
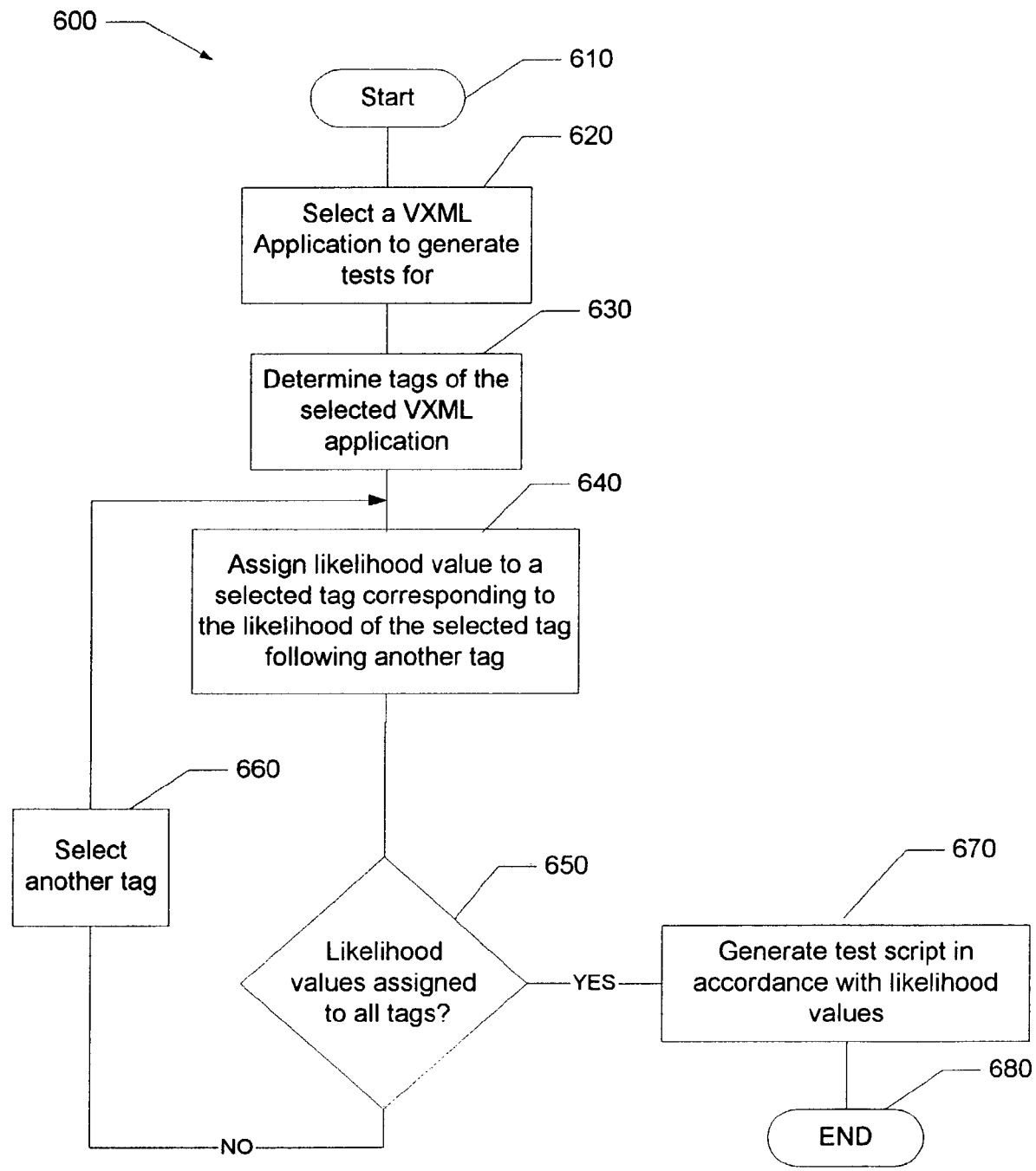
FIG. 10 is a flow chart of a third method for generating test scripts from VXML applications.

FIGS. 6, 8 and 10 are flow charts of different methods used to automatically generate test scripts for IVR VXML applications. The rectangular elements of the flow charts are herein denoted "processing blocks" and represent computer software instructions or groups of instructions. The diamond shaped elements of the flow charts are herein denoted "decision blocks," and represent computer software instructions or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required to operate in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 5:
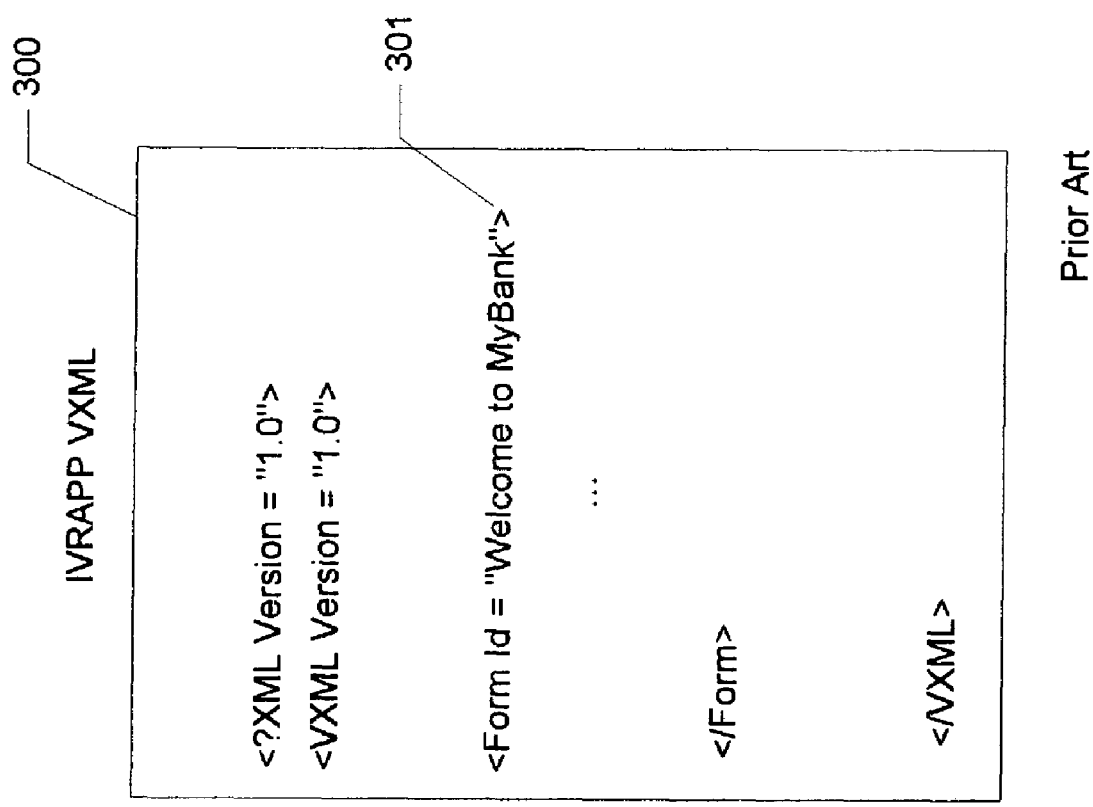
FIG. 5 is a diagram of an exemplary VXML application.

Referring now to FIG. 5, an exemplary flow diagram shows a simple voice application 300 having a voice-capable markup language. In this particular example, VXML version 1.0 is shown. However, in other embodiments, the invention is equally applicable to other speech related markup languages, including but not limited to SALT, CCML, and other versions of VXML. The application 300 is titled IVRAPP.VXML. As stated above, VXML application files have the .vxml extension. This application 300 includes tags, one of which is labeled 301. This tag will provide the audio prompt "Welcome to MyBank" upon execution. This prompt will be heard by the user in an audio format. While only one tag 301 is described, it should be appreciated that a VXML IVR application will contain several tags. In order to properly test such an application, a test script needs to be provided which will access the IVR, perform the steps necessary to get to the tag 10 and verify that the audio prompt provide by tag 10 was heard by the user.

One method of generating a test script to test an IVR having a VXML application is to parse the VXML file and generate test sequences for each tag. These sequences are then assembled into a test script. This type of test generation process 400 is shown in the flow chart of FIG. 6.

Referring now to FIG. 6, the first step 410 is shown which starts the process of automatically generating test code for IVR VXML applications. Following step 410, step 420 is executed.

Step 420 recites selecting a VXML application to generate tests for. At this step a VXML application, such as IVRAPP.VXML from FIG. 5 is identified as the application to generate a test script for. The test script will access the IVR application, provide the necessary prompts to the application, and verify the proper results are received from the application.

Step 430 is performed next and discloses that the VXML application identified in step 420 is parsed in order to identify the relevant tags within the application. Once the tags have been identified, the step terminates.

After termination of step 430, step 440 is executed. Step 440 states that a test sequence is generated for a tag. This test sequence may include providing various inputs to the tag and checking for various outputs from the tag.

In one particular embodiment, the inputs to the tags are provided by analyzing the voice-capable markup language application to find an externally referenced file, retrieving the externally referenced file, and analyzing the externally referenced file to determine an input to the tag. The externally referenced file can be one of a variety of file types, including, but not limited to, an audio file.

In another embodiment, the inputs to the tags are provided by analyzing the voice-capable markup language application to determine an expected voice input and a voice-recognized text input associated with a branch of the voice capable markup language application, and analyzing the expected voice input and the voice-recognized text input to determine an input to the tag.

In one embodiment, the outputs of the tags are provided by a library of utterance and phrases. In another embodiment, the outputs of the tags are provided by synthesized text-to-speech.

Step 450 is executed next, and recites that a check is made to determine if a test sequence has been provided for each tag identified in step 430. If every tag has not had a test sequence generated for it, step 440 and 450 are repeated until each tag has a respective test sequence.

Following step 450, step 460 is executed. Step 460 discloses that the test sequences are compiled into a test script. The resulting test script will then be used to test and exercise the VXML application.

Following the compilation of the test script, the process ends, as indicated at step 470.

In another embodiment, software is used which automatically generates test scripts from a call flow diagram. An example of this type of software is the Hammer Callmaster™ available from Empirix Inc. of Waltham, Mass. This software eliminates the tedious task of manual test design and execution by providing to users the ability to automatically generate and execute tests derived from a call flow diagram.

Call flow diagrams are created using a graphical call flow editor in conjunction with a standard library of call flow icons. Each call flow icon contains the test code necessary to execute the call flow action and an appropriate set of default telephony parameters. These parameters can be overridden on either a global or instance basis. Users can further specify the data to be used on the tests. The icons are provided as a result of the parsing of the VXML application.

By way of the test generation software, test developers produce automated tests simply by diagramming an application's call flow using a set of standard and/or custom icons provided by the parsing of the VXML application. Using automatic test generation technology, the software generates a set of test scripts that are used to exercise all or part of the call flow paths and data in the cal flow diagram. The test can further be used for post-deployment monitoring and maintenance to ensure that the application continues to deliver the highest possible level of customer Quality of Experience (QoE).

Figure 7:
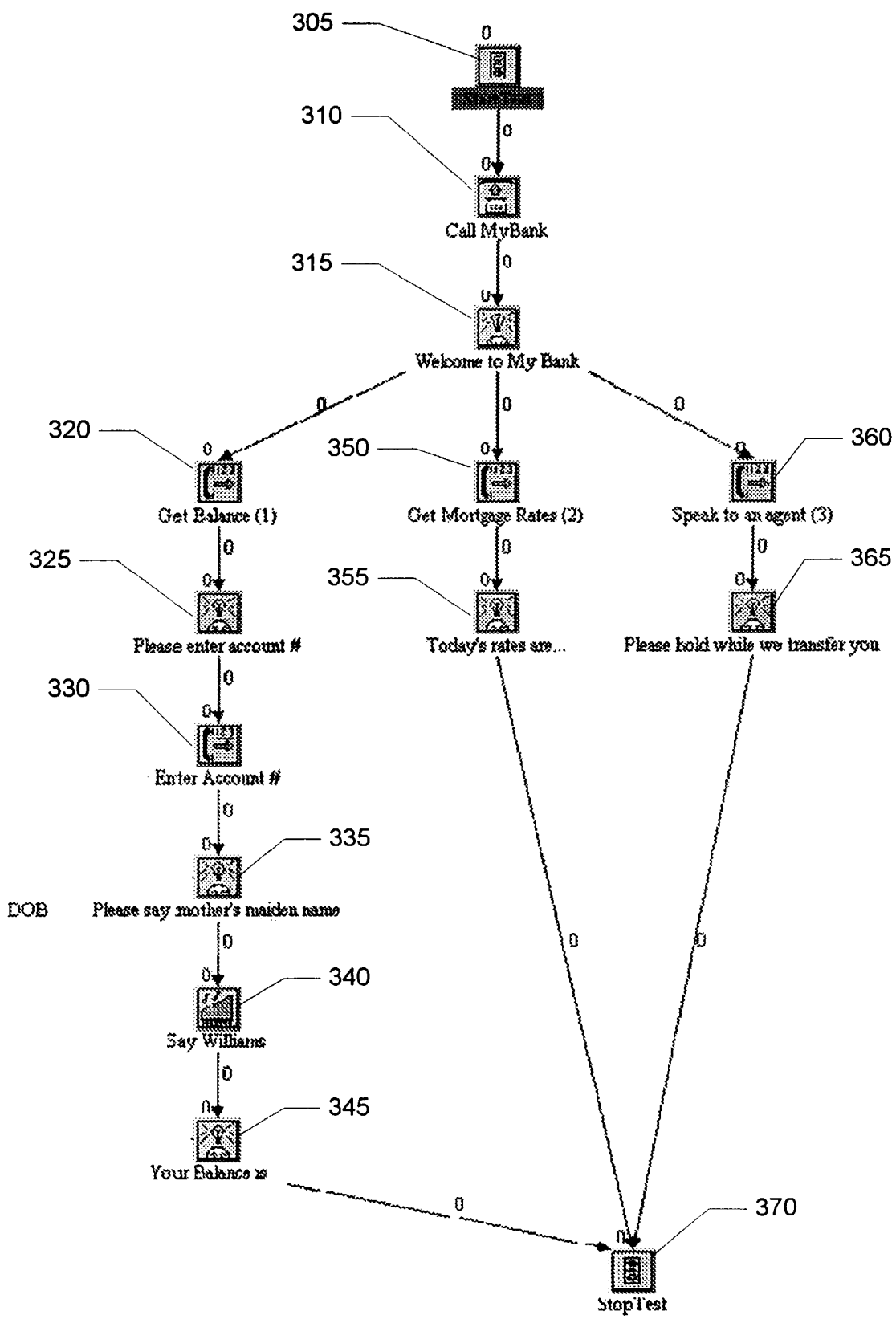
FIG. 7 is an exemplary call flow diagram.

Referring now to FIG. 7, a sample call flow diagram for an IVR application is shown. Each icon represents a piece of test code for testing the function represented by the icon. The icons are connected together to form a test script which tests the application.

The first icon 350 provides test code for starting the test. The piece of test code represented by this icon will perform various initialization functions, such as initializing counters, initializing the modem, and the like.

The next icon 310 represents a piece of test code for calling the bank. The test system running the test will dial the phone number of the bank. The piece of code represented by this icon may also determine that the call was placed successfully, and that there wasn't a busy signal or the call was otherwise not completed or connected.

Icon 315 denotes test code for determining that the call was received properly by the bank. Test code is also provided for determining and that the bank supplied the proper response. At this point the test system is given three choices. The test system is presented with the prompt telling the system that it may push 1 to get a balance, push 2 to get a mortgage rate, or push 3 to speak to a bank agent.

Icon 360 represents test code that is utilized upon the system selecting to speak to a bank agent. The test code generates a tone to the bank similar to the tone produced by pressing a "3" on a touch-tone phone.

Icon 365 denotes test code for verifying that the bank received the "3" and that the test system has been put on hold while the call is transferred to an agent. Upon completion, the test finishes as depicted by icon 370, the stop test icon. The test code associated with icon 370 stops the test and disconnects the call.

Icon 350 test code is encountered upon the test system selecting to get a mortgage rate by supplying a tone to the bank system similar to the tone produced by a "2" on a touch tone phone. The test code verifies the tone was received by the bank system and that the bank system is ready to respond to the request.

Icon 355 represents the test code verifying that the message playing today's mortgage rates was received by the test system. After this the icon 370, described above, is encountered and the test stops.

Icon 320 test code is encountered upon the system generating a tone to the bank similar to the tone produced by pressing a "1" on a touch-tone phone. This test code verifies that the tone was received by the bank IVR system. The next icon 325 represents test code for verifying that that the prompt "Please enter account number" was properly received.

Icon 330 represents test code for providing the account number to the bank and verifies that the account number was properly received. Up to this point, all the behavior of the application has been deterministic, in that it does not change from call to call, and can be tested properly as described above. However, for security and/or other reasons, some IVR systems are employing non-deterministic behavior. Non-deterministic behavior has a random or dynamic piece to it, such that a call will not always follow the same flow every time.

Icon 335 represents test code and the first instance of non-deterministic or dynamic behavior. For some banking IVR systems as a security precaution the system will randomly ask for either the user's mother's maiden name or for the user's date of birth. The choice as to which security check to ask is entirely random, and as such cannot be determined beforehand.

When the test code associated with icon 335 is executed it expects to receive the prompt "please say mother's maiden name." In the event that this prompt is received, the test code associated with icon 340 is then executed, which provides the mother's maiden name to the bank IVR system. Following this, test code associated with icon 345 is executed which verifies that the balance was received from the bank IVR system, then the code of icon 370 is executed which ends the test.

Referring now to FIG. 8, another method of generating test scripts for VXML applications is shown. The first step 510 starts the process of automatically generating test code for IVR VXML applications. Following step 510, step 520 is executed.

Step 520 recites selecting a VXML application to generate tests for. At this step a VXML application, such as IVRAPP.VXML from FIG. 5 is identified as the application to generate a test script for. The test script will access the IVR application, provide the necessary prompts to the application, and verify the proper results are received from the application.

Step 530 is performed next and discloses that the VXML application identified in step 520 is parsed in order to identify the relevant tags within the application. Once the tags have been identified, the step terminates.

After termination of step 530, step 540 is executed. Step 540 stats that an icon is selected from a pool of available icons that represent the tag for each tag.

Step 550 is executed next, wherein a call flow diagram incorporating the icons is produced.

Following step 550, step 560 is executed. Step 560 recites that a test script is generated from the call flow diagram. The resulting test script will then be used to test and exercise the IVR VXML application. Following the generation of the test script, the process ends, as indicated at step 570.

Figure 9:
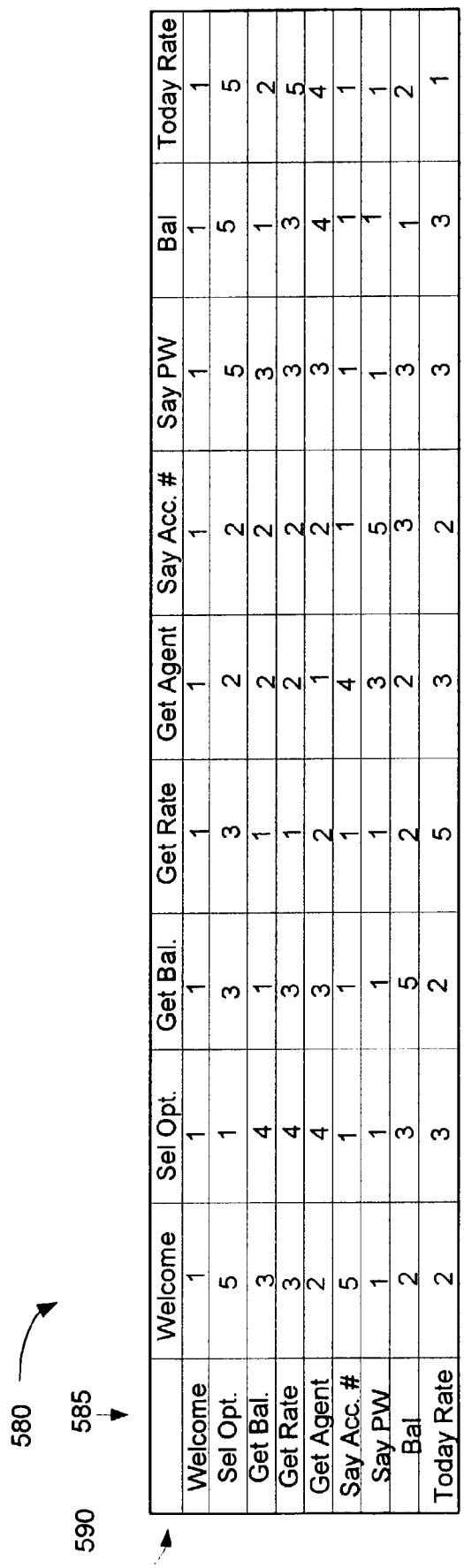
FIG. 9 is a diagram of an exemplary grid.

In a further embodiment, a matrix or grid 580 as shown in FIG. 9, containing numerical likelihood values corresponding to the likelihood of one VXML tag following another VXML tag in a test script utilized for exercising the IVR running the VXML application. Each of the tags of the VXML application is placed on both a vertical axis 585 and a horizontal axis 590 of the grid 580. An integer value is then placed in each cell to indicate the likelihood of the corresponding tag on the horizontal axis 590 following the corresponding tag on the vertical axis 585.

Values of 1-5 are used to indicate the likelihood value, with a 5 indicating the highest likelihood and a 1 indicating the lowest likelihood. While values between 1 and 5 are used in this example, it should be appreciated that any range of values could be used. As shown in the example of FIG. 9, it is least likely that the "welcome" tag would follow a "welcome" tag, as indicated by the "1" in the corresponding cell. On the other hand, it is most likely that the "say acct. #" tag would follow the "welcome" tag as indicated by the "5" in the corresponding cell.

Referring now to FIG. 10, a process for automatically generating test scripts for VXML applications is shown. The first step 610 is shown which starts the process of automatically generating test code for IVR VXML applications. Following step 610, step 620 is executed.

Step 620 recites selecting a VXML application to generate tests for. The test script will access the VXML application, provide the necessary prompts to the application, and verify the proper results are received from the application.

Step 630 is performed next. Step 630 discloses that the VXML application identified in step 620 is parsed in order to identify the relevant tags within the application. Once the tags have been identified, the step terminates.

After termination of step 630, step 640 is executed. Step 640 states that likelihood values are assigned to a selected tag corresponding to the likelihood of the selected tag following another tag.

Step 650 is executed next, wherein a check is made to determine if a likelihood value has been provided for each tag identified in step 630. If every tag has not had a likelihood value generated for it, steps 640, 650 and 660 (select another tag) are repeated until each tag has a respective likelihood value.

Following the provision of a likelihood value for each tag, step 670 is executed. In step 660 a test script is generated in accordance with the likelihood values. The resulting test script will then be used to test and exercise the IVR VXML application. Following the generation of the test script, the process ends, as indicated at step 680.

A method has been described for generating test scripts for testing an IVR from an IVR's VXML application. The test scripts can be generated directly from the VXML application, from a product which provides a graphical representation of the IVR from the IVR's VXML application, or a grid can be used to represent the tags within the VXML application and a test script generated from the grid. Additionally, a virtual telephone caller system is provided to test the IVR of a contact center, wherein the virtual telephone caller system operates with voice extensible markup language (VXML) software scripts.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer-implemented method for generating at least one test script for testing a voice-capable mark-up language application, in which a computer system performs operations comprising:

identifying the voice-capable markup language application to be tested;

determining the tags of the voice-capable markup language application; and producing a test script for testing said voice-capable markup language application from said tags of said voice-capable markup language application wherein said producing a test script comprises:

providing a grid, said grid having each tag of the voice-capable mark-up language application along a vertical axis and each tag of the voice-capable mark-up language application along a horizontal axis;

establishing a likelihood value in each cell of said grid, said likelihood value corresponding to a likelihood of the corresponding tag on the horizontal axis following the corresponding tag on the vertical axis; and generating at least one test script in accordance with the likelihood value for each tag.

2. The method of claim 1, wherein the voice-capable markup language comprises one or more of voice extensible markup language (VXML), speech application language tags (SALT), and call control extensible markup language (CCML).

3. The method of claim 1 wherein said determining comprises parsing said voice-capable markup language application to identify relevant tags within said voice-capable markup language application.

4. The method of claim 1 wherein said voice-capable markup language application comprises a voice-capable markup language Interactive Voice Response (IVR) application.

5. The method of claim 1 wherein said producing a test script comprises generating at least one test sequence for each tag and assembling said test sequences into said test script.

6. The method of claim 5 wherein said generating at least one test sequence comprises generating test sequences including at least one of providing inputs to at least one of said tags and checking outputs from at least one of said tags.

7. The method of claim 6, wherein said providing the inputs to the at least one of said tags comprises:

analyzing the voice-capable markup language application to find an externally referenced file;

retrieving the externally referenced file; and analyzing the externally referenced file to determine an input to the at least one of said tags.

8. The method of claim 7, wherein the externally referenced file comprises an audio file.

9. The method of claim 6, wherein said providing the inputs to the at least one of said tags comprises:

analyzing the voice-capable markup language application to determine an expected voice input and a voice-recognized text input associated with a branch of the voice-capable markup language application; and analyzing the expected voice input and the voice-recognized text input to determine an input to the at least one of said tags.

10. The method of claim 9, wherein a library of utterances and phrases provides the output of the at least one of said tags.

11. The method of claim 9, wherein synthesized text-to-speech comprises the output of the at least one of said tags.

12. The method of claim 1 wherein said producing a test script comprises:
providing an icon for each tag;
producing a call flow diagram incorporating each said icon; and
generating a test script from said call flow diagram.

13. The computer-implemented method for testing a contact center IVR system, in which a computer system performs operations comprising:
generating a voice-capable markup language test script associated with a software script generator, wherein said generating a voice-capable markup language test script comprises:
providing a grid, said grid having each tag of the voice-capable markup language application along a vertical axis and each tag of the voice-capable markup language application along a horizontal axis;
establish a likelihood value in each cell of said grid, said likelihood value corresponding to a likelihood of the corresponding tag on the horizontal axis following the corresponding tag on the vertical axis; and
generate at least one voice-capable markup language test script in accordance with the likelihood value for each tag;
generating a first software linkage to a voice-capable markup language test page, the voice-capable markup language test page within a test voice-capable markup language server, the generating in response to the voice-capable markup language test script;
generating audio signals with a voice-capable markup language browser, the generating in response to the first software linkage to the voice-capable markup language test page; and
converting the audio signals to telephone audio signals with a telephony Interface adapted to couple to the PSTN.

14. The method of claim 13, wherein the voice-capable markup language comprises one or more of VXML, SALT, and CCML.

15. The method of claim 13 further comprising generating a GUI and wherein said generating a voice-capable markup language test script further comprises generating a voice-capable markup language test script associated with said GUI.

16. The method of claim 13 further comprising receiving an IVR audio response with the telephony interface.

17. The method of claim 16 further comprising converting the IVR audio response with the telephony interface to a response text.

18. The method of claim 13 further comprising generating a second software linkage to a voice-capable markup language compare page, the second software linkage provided by the voice-capable markup language browser in response to the response text.

19. The method of claim 13 further comprising generating a voice-capable markup language compare page with the test voice-capable markup language server, the generating in response to the second software call.

20. The method of claim 19 further comprising comparing the voice-capable markup language test page to the voice-capable markup language compare page.

21. A computer readable storage medium having computer readable code thereon for for generating at least one test script for testing a voice-capable mark-up language application, the medium including instructions in which a computer system performs operations comprising:
identify the voice-capable markup language application to be tested;
determine the tags of the voice-capable markup language application; and
produce a test script for testing said voice-capable markup language application from said tags of said voice-capable markup language application, wherein said produce a test script comprises:
providing a grid, said grid having each tag of the voice-capable markup language application along a vertical axis and each tag of the voice-capable markup language application along a horizontal axis;
establishing a likelihood value in each cell of said grid, said likelihood value corresponding to a likelihood of the corresponding tag on the horizontal axis following the corresponding tag on the vertical axis; and
generating at least one test script in accordance with the likelihood value for each tag.

22. The computer readable storage medium of claim 21, wherein the voice-capable markup language comprises one or more of VXML, SALT, and CCML.

23. The computer readable storage medium of claim 21 wherein said instructions for causing a processor to determine the tags of the voice-capable markup language application comprise instructions for causing a processor to parse said voice-capable markup language application to identify relevant tags within said voice-capable markup language application.

24. The computer readable storage medium of claim 21 wherein said voice-capable markup language application comprises a voice-capable markup language Interactive Voice Response (IVR) application.

25. The computer readable storage medium of claim 21 wherein said instructions for causing a processor to produce a test script comprise instructions for causing a processor to generate at least one test sequence for each tag and instructions for causing a processor to assemble said test sequences into said test script.

26. The computer readable storage medium of claim 25 wherein said instructions for causing a processor to generate at least one test sequence comprise instructions for causing a processor to generate test sequences including at least one of providing inputs to one of said tags and checking outputs from one of said tags.

27. The computer readable storage medium of claim 21 wherein said instructions for causing a processor to produce a test script comprises instructions for causing a processor to:
provide an icon for each tag;
produce a call flow diagram incorporating each said icon; and
generate a test script from said call flow diagram.

28. A computer readable storage medium having computer readable code thereon for for generating at least one test script for testing a contact center IVR system, the medium including instructions in which a computer system performs operations comprising:
generate a voice-capable markup language test script associated with a software script generator wherein said generating a voice-capable markup language test script comprises:
providing a grid, said grid having each tag of the voice-capable markup language application along a vertical axis and each tag of the voice-capable markup language application along a horizontal axis;

establishing a likelihood value in each cell of said grid, said likelihood value corresponding to a likelihood of the corresponding tag on the horizontal axis following the corresponding tag on the vertical axis; and generating at least one voice-capable markup language test script in accordance with the likelihood value for each tag;

generate a first software linkage to a voice-capable markup language test page, the voice-capable markup language test page within a test voice-capable markup language server in response to the voice-capable markup language test script;

generate audio signals with a voice-capable markup language browser in response to the first software linkage to the voice-capable markup language test page; and convert the audio signals to telephone audio signals with a telephony interface adapted to couple to a PSTN.

29. The computer readable storage medium of claim 28 further comprising instructions for causing a processor to generating a GUI and wherein said instructions for causing a processor to generate a voice-capable markup language test script further comprises instructions for causing a processor to generate a voice-capable markup language test script associated with said GUI.

30. The computer readable storage medium of claim 28 further comprising instructions for causing a processor to receive an IVR audio response with the telephony interface.

31. The computer readable storage medium of claim 30 further comprising instructions for causing a processor to convert the IVR audio response with the telephony interface to a response text.

32. The computer readable storage medium of claim 28 further comprising instructions for causing a processor to generate a second software linkage to a voice-capable markup language compare page, the second software linkage provided by the voice-capable markup language browser in response to the response text.

33. The computer readable storage medium of claim 28 further comprising instructions for causing a processor to generate a voice-capable markup language compare page with the test voice-capable markup language server in response to the second software call.

34. The computer readable storage medium of claim 33 further comprising instructions for causing a processor to compare the voice-capable markup language test page to the voice-capable markup language compare page.

35. The computer readable storage medium of claim 28, wherein the voice-capable markup language comprises one or more of VXML, SALT, and CCML.

* * * * *